United States Patent [19]
Taub et al.

[11] 3,900,433
[45] Aug. 19, 1975

[54] EXPANDABLE POLYSTYRENE BEADS

[75] Inventors: Bernard Taub, Williamsville; Daniel F. Harnish, Orchard Park, both of N.Y.

[73] Assignee: Allied Chemical Corporation, New York, N.Y.

[22] Filed: Dec. 17, 1973

[21] Appl. No.: 425,372

[52] U.S. Cl. ............................ 260/2.5 B; 260/2.5 E
[51] Int. Cl. ................................................ G08j 1/26
[58] Field of Search ...................... 260/2.5 B, 2.5 E

[56] References Cited
UNITED STATES PATENTS

| | | | |
|---|---|---|---|
| 2,861,898 | 11/1958 | Platzer | 260/2.5 B |
| 3,344,221 | 9/1967 | Moody et al. | 260/2.5 E |
| 3,505,248 | 4/1970 | Banks et al. | 260/2.5 B |

*Primary Examiner*—Morton Foelak
*Attorney, Agent, or Firm*—Michael L. Dunn; Jay P. Friedenson

[57] ABSTRACT

A styrene polymer bead impregnated with a blowing agent containing from about 0.5 to about 20 weight percent of an impregnation aid and the process for preparing same.

16 Claims, No Drawings

EXPANDABLE POLYSTYRENE BEADS

BACKGROUND OF THE INVENTION a. Field of the Invention

This invention relates to a process for the manufacture of foamable thermoplastic resins. More particularly, this invention is concerned with a process for impregnating polystyrene beads with a liquid blowing agent to produce foamable beads.

b. History of the Prior Art

Foamable beads containing blowing agents are used in the production of rigid polymer foams. The blowing agents used have boiling points below the softening temperature of the thermoplastic beads and also exert very little solvent action on the beads. When the foamable beads are heated, the blowing agent vaporizes causing the beads to expand to many times their original size. The foamed beads are then easily molded into a variety of useful articles such as cups, dishes, packaging materials, refrigerator components, insulation boards and the like.

There are several processes available for impregnating polystyrene beads with blowing agent. One process involves the aqueous suspension polymerization of styrene in the presence of blowing agent. Another process involves treating polystyrene beads with blowing agent in aqueous suspension. Both of these processes require an aqueous diluent along with suspension stabilizers to insure sufficient incorporation of blowing agent into the polystyrene beads.

Other prior art processes disclose the use of gaseous hydrocarbon to impregnate the polystyrene beads. However, unduly long periods of time are required for impregnation. Another process uses liquified hydrocarbons to impregnate the polystyrene. However, the latter process requires slightly elevated temperatures which can result in the agglomeration or fusion of the polystyrene beads.

BRIEF DESCRIPTION OF THE INVENTION

The invention is a novel expandable styrene polymer particle and novel process for making same comprising contacting particles of the styrene polymer with a blowing agent, said blowing agent containing from about 0.5 to about 20 and preferably from about 3 to about 15 weight percent of an impregnation aid consisting of a compound having a solubility parameter between about 7 and 12 hildebrands, a critical volume of less than about 190 cm³/gram mole and a hydrogen bonding parameter contribution to said solubility parameter of less than 5 hildebrands.

The novel process as described herein permits impregnation of polystyrene particles, e.g., polystyrene beads, with liquid blowing agents at low temperatures, e.g., between about 20° and about 35°C while preventing agglomeration of the particles. The resulting particles are free flowing and readily expand upon the application of sufficient heat.

DETAILED DESCRIPTION OF THE INVENTION

Styrene polymer as used herein means a polymer formed from at least 50 weight percent and preferably at least 75 weight percent styrene monomer. The most preferred styrene polymer is formed from at least 95 weight percent styrene monomer. Styrene monomer includes both methyl styrene and unsubstituted styrene but is preferably unsubstituted styrene.

The styrene polymer particles are preferably polystyrene beads but may be particles of any shape. The size of the particles is generally between about 15 and about 75 mesh and is preferably between about 20 and about 45 mesh.

The blowing agent is a volatile organic fluid which is a gas or which will produce gas upon heating. Preferred blowing agents include aliphatic hydrocarbons containing from 1 to 7 carbon atoms in the molecule and their halogenated derivatives which boil below the softening point of the styrene polymer but which preferably are not solvents for the polymer and do not readily escape from the polymer at room temperature. Examples of preferred hydrocarbon blowing agents are butane, isobutane, pentane, isopentane, n-hexane, 2-methyl pentane and 3-methyl pentane. Examples of preferred halogenated hydrocarbons are symmetrical and assymetrical dichlorotetrafluoroethane and dichlorodifluoromethane. Preferably from about 4 to about 10 weight percent blowing agent, including impregnation aid, is incorporated into the polymer.

The impregnation aid, which is incorporated into the blowing agent, is a compound which enhances the impregnation rate of a primary blowing agent into the styrene polymer. The impregnation aid is a compound having a solubility parameter between about 7 and 12 hildebrands, a critical volume of less than about 190 cm³/gram mole and a hydrogen bonding parameter contribution to the solubility parameter of less than 5 hildebrands. The impregnation aid is believed to soften the styrene polymer thus permitting the blowing agent to be more easily incorporated into the styrene polymer. In order to soften the styrene polymer, the impregnation aid should have a solubility parameter close to the solubility parameter of polystyrene, i.e., between about 7 and 12 hildebrands. If a compound has a solubility parameter below about 7 or above about 12 hildebrands it will not act as an impregnation aid for polystyrene since the desired softening of the polystyrene will not occur.

The solubility parameter unit is the square root of calories per cubic centimeter and is designated as a "hildebrand". Unless otherwise indicated the solubility parameters as used herein are measured at 25° centigrade. The solubility parameter $\delta$ may be broken down into three solubility parameter contributions as follows:

$$\delta^2 = \delta_D^2 + \delta_P^2 + \delta_H^2$$

where $\delta_D$ is the dispersion component of the solubility parameter, $\delta_P$ is the polar component of the solubility parameter, and $\delta_H$ is the hydrogen bonding component of the solubility parameter. For a discussion of the solubility parameter see page 889 of the supplemental volume of the Encyclopedia of Chemical Technology 2nd Ed, Kirk-Othmer, published by John Wiley and Sons Inc., New York 1971.

In order to insure the proper softening effect upon the styrene polymer by the impregnation aid, it has been found that the hydrogen bonding component of the solubility parameter should be less than 5 hildebrands.

In addition in order to insure proper penetration of the impregnation aid into the styrene polymer it has also been found that the critical volume of the impregnation aid should be less than about 190 cm³/gram mole. While not wishing to be bound by any particular theory, it is believed that the molecular size of the impregnation aid must be kept small in order to penetrate into the styrene polymer and that the low critical volume is related to the required small molecular size.

From about 1 to about 20 weight percent and preferably from about 3 to about 15 weight percent of impregnation aid is incorporated into the blowing agent to assist penetration of the blowing agent into the styrene polymer. Before the present invention many blowing agents either could not be incorporated by impregnation into the styrene polymer or could be incorporated only after extended periods of time or with the application of heat. The addition of the impregnation aid reduces the time required for impregnation, permits the use of blowing agents which could not previously be used, and permits more rapid impregnation at lower temperatures than was previously possible. The maximum amount of impregnation aid used is limited by the softening effect of the impregnation aid upon the styrene polymer, since the amount of impregnation aid used must be less than an amount which will cause unacceptable softening. Only sufficient impregnation aid is used to permit incorporation of the blowing agent into the styrene polymer particle to form a novel free flowing styrene polymer particle which will expand upon application of sufficient heat to soften the styrene polymer.

Examples of suitable impregnation aids, their solubility parameters, their hydrogen bonding contribution to their solubility parameter and their critical volumes are shown in table I.

TABLE I

| Compound | Solubility Parameter | Hydrogen Bonding Contribution | Critical Volume |
|---|---|---|---|
| monochloromonofluoromethane ($CH_2ClF$) | 9.01 | ≈3 | 162 |
| methylformate | ≈9.9 | ≈4.3 | 172 |
| methyl chloride ($CH_3Cl$) | 8.30 | 1.9 | 143 |
| acetonitrile | 11.9 | 3.0 | 173 |
| carbon disulfide ($CS_2$) | 10.0 | 0.3 | 170 |

The most preferred impregnation aid is $CH_2ClF$ in that fusion and agglomeration of the beads seems to be less likely.

In practicing the process of this invention the blowing agent containing the impregnation aid is contacted with the styrene polymer particles, e.g., polystyrene beads, by any suitable means known to those skilled in the art. For example the styrene polymer particles may be contacted with the blowing agent in liquid suspension or the particles may be contacted with the vapor of the blowing agent. The process may be practiced at atmospheric or superatmospheric pressures e.g. 5 atmospheres. The temperature at which the process is performed may vary but to reduce the likelihood of agglomeration is preferably carried out near room temperature e.g., between about 20° and 35° centigrade.

The following examples serve to illustrate the process of the invention whereby the novel impregnated styrene polymer particles are formed. Unless otherwise indicated all parts and percentages are by weight.

EXAMPLES

In the following examples 200 grams of polystyrene beads having an average particle size of between about 20 and 45 mesh are added to an autoclave fitted with an agitator and cooling means. The autoclave is then evacuated and cooled and 500 grams of liquid blowing agent, which may or may not contain impregnation aid, are added. The mixture is then agitated for 6 hours at room temperature (25°C), allowing the pressure to build up to the normal vapor pressure of the blowing agent. After 18 hours the remaining liquid blowing agent is removed and the polystyrene beads are measured for blowing agent content and pre-puff density. The pre-puff density is determined by measuring the bead density after the beads are exposed to live steam at 95°C for 5 minutes. The following table II for each example, gives the blowing agent used, the impregnation aid used, if any, the percent blowing agent absorption, the weight ratio of blowing agent to impregnation aid, the pre-puff density in pounds per cubic foot if measured, and pertinent remarks.

TABLE II

| Example | Blowing Agent | Impregnation Aid | Ratio | Percent Absorption | Pre-Puff Density | Remarks on Resulting Beads |
|---|---|---|---|---|---|---|
| 1. | $CCl_2F_2$ | None | 100/0 | 0.8 | — | No expansion |
| 2. | $CCl_2F_2$ | $CH_2ClF$ | 95/5 | 15.2 | 1.70 | Free flowing |
| 3. | $CCl_2F_2$ | $CH_2ClF$ | 93/7 | 18.0 | 1.67 | Free flowing |
| 4. | $CCl_2F_2$ | $CH_2ClF$ | 90/10 | 20.0 | 1.00 | Slight agglomeration |
| 5. | $CCl_2F_2$ | $CH_2ClF$ | 85/15 | — | — | Fused |
| 6. | $CCl_2F_2$ | $CH_3Cl$ | 97/3 | 6.0 | 1.5 | Free flowing |
| 7. | $CCl_2F_2$ | $CH_3Cl$ | 95/5 | 11.2 | — | Free flowing |
| 8. | $CCl_2F_2$ | $CH_3Cl$ | 93/7 | 16.8 | 1.41 | Slight agglomeration |
| 9. | $CCl_2F_2$ | $CH_3Cl$ | 90/10 | — | — | Fused |
| 10. | $CCl_2F_2$ | $CH_2F_2$ | 90/10 | 3.4 | — | Free flowing |
| 11. | $CCl_2F_2$ | $CHF_2CH_3$ | 90/10 | 1.8 | — | Free flowing |
| 12. | $CCl_2F_2$ | Methyl Formate | 97/3 | 2.8 | — | Free flowing |
| 13. | $CCl_2F_2$ | Methyl Formate | 94/6 | 7.4 | — | Agglomeration |
| 14. | $CCl_2F_2$ | Methyl Formate | 90/10 | — | — | Fused |
| 15. | $CCl_2F_2$ | $CS_2$ | 97/3 | 9.3 | — | Free flowing |
| 16. | $CCl_2F_2$ | $CS_2$ | 90/10 | — | — | Agglomeration |
| 17. | $CCl_2F_2$ | Acetonitrile | 97/3 | 8.8 | — | Free flowing |
| 18. | Isobutane | None | 100/0 | 0.6 | — | No expansion |
| 19. | Isobutane | $CH_2ClF$ | 90/10 | 6.4 | 2.0 | Free flowing |
| 20. | Isobutane | $CH_2ClF$ | 85/15 | 10.3 | 0.61 | Free flowing |
| 21. | Isobutane | $CH_3Cl$ | 90/10 | 6.0 | 1.84 | Free flowing |
| 22. | Isobutane | $CH_3Cl$ | 85/15 | 10.6 | 0.49 | Agglomeration |
| 23. | Pentane | None | 100/0 | 0.6 | — | No expansion |
| 24. | Pentane | $CH_2ClF$ | 95/5 | 11.3 | — | Slight agglomeration |
| 25. | Pentane | $CH_3Cl$ | 97/3 | 7.0 | — | Agglomeration |
| 26. | Pentane | $CH_3Cl$ | 95/5 | — | — | Fusion |
| 27. | Isopentane | None | 100/0 | 0.2 | — | No expansion |

TABLE II – Continued

| Example | Blowing Agent | Impregnation Aid | Ratio | Percent Absorption | Pre-Puff Density | Remarks on Resulting Beads |
|---|---|---|---|---|---|---|
| 28. | Isopentane | CH₂ClF | 95/5 | 6.7 | 1.47 | Free flowing |
| 29. | Isopentane | CH₂ClF | 90/10 | — | — | Fusion |
| 30. | Isopentane | CH₃Cl | 97/3 | 6.0 | — | Slight agglomeration |
| 31. | Isopentane | CH₃Cl | 95/5 | — | — | Fusion |
| 32. | Butane | None | 100/0 | 3.0 | 2.5 | |
| 33. | Butane | CH₂ClF | 95/5 | 9.8 | 0.87 | Free flowing |
| 34. | Butane | CH₃Cl | 97/3 | 5.2 | — | Slight agglomeration |
| 35. | Butane | CH₃Cl | 95/5 | 8.3 | 0.78 | Agglomeration |

A comparison of the foregoing examples clearly indicates that when an impregnation aid as described herein is used in conjunction with a blowing agent better absorption of the blowing agent into the polystyrene results.

What is claimed is:

1. A process for making expandable styrene polymer particles by contacting particles of said styrene polymer with a volatile organic fluid blowing agent, said blowing agent containing from about 0.5 to about 20 percent by weight of blowing agent of an impregnation aid consisting essentially of a compound having a solubility parameter between 7 and 12 hildebrands, a critical volume of less than about 190 cm³/gram mole and a hydrogen bonding parameter contribution to said solubility parameter of less than 5 hildebrands, the impregnation aid being present in an amount sufficient to permit incorporation of the blowing agent into the styrene polymer particle to form a free flowing styrene polymer particle.

2. The process of claim 1 wherein the styrene polymer is insoluble in the blowing agent.

3. The process of claim 2 wherein said styrene polymer is contacted with the blowing agent in liquid suspension.

4. The process of claim 1 wherein the impregnation aid is selected from methyl chloride or monochloromonofluoromethane.

5. The process of claim 4 wherein the blowing agent is a hydrocarbon selected from butane, isobutane, pentane, isopentane, n-hexane, 2 methyl pentane and 5 methyl pentane.

6. The process of claim 4 wherein the blowing agent is a halogenated hydrocarbon selected from symmetrical and assymetrical dichlorotetrafluoroethane and dichlorodifluoromethane.

7. The process of claim 2 wherein the impregnation aid is monochloromonofluoromethane.

8. The process of claim 7 wherein said styrene polymer is contacted with the blowing agent in liquid suspension.

9. The process of claim 6 wherein the impregnation aid is selected from methyl chloride or monochloromonofluoromethane.

10. The process of claim 1 wherein the process is performed at a temperature between about 20° and about 35°C.

11. The process of claim 1 wherein from about 3 to about 15 weight percent of impregnation aid is used.

12. A free flowing styrene polymer particle impregnated with a blowing agent containing from about 0.5 to about 20 percent by weight of blowing agent of an impregnation aid, said impregnation aid consisting essentially of a compound having a solubility parameter between 7 and 12 hildebrands, a critical volume of less than about 190 cm³/gram mole and a hydrogen bonding parameter contribution to said solubility parameter of less than 5 hildebrands.

13. The polymer according to claim 12 wherein the blowing agent is a hydrocarbon selected from butane, isobutane, pentane, isopentane, n-hexane, 2 methyl pentane and 5 methyl pentane.

14. The polymer according to claim 12 wherein the blowing agent is a halogenated hydrocarbon selected from symmetrical and assymetrical dichlorotetrafluoroethane and dichlorodifluoromethane.

15. The polymer according to claim 12 wherein the impregnation aid is selected from methyl chloride or monochloromonofluoromethane.

16. The polymer according to claim 15 wherein the impregnation aid is monochloromonofluoromethane.

* * * * *